US006374338B1

United States Patent
Garvey

(10) Patent No.: US 6,374,338 B1
(45) Date of Patent: Apr. 16, 2002

(54) METHOD FOR PERFORMING CONFIGURATION TASKS PRIOR TO AND INCLUDING MEMORY CONFIGURATION WITHIN A PROCESSOR-BASED SYSTEM

(75) Inventor: Joseph Franklin Garvey, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/344,051

(22) Filed: Jun. 25, 1999

(51) Int. Cl.[7] .............................................. G06F 13/00
(52) U.S. Cl. ......................................... 711/170; 713/2
(58) Field of Search ................................ 711/152, 159, 711/170; 713/1, 2; 714/38

(56) References Cited

U.S. PATENT DOCUMENTS

| 5,371,876 A | * | 12/1994 | Ewertz et al. | 711/159 |
| 5,479,639 A | * | 12/1995 | Ewertz et al. | 711/152 |
| 5,530,847 A | * | 6/1996 | Schieve et al. | 714/38 |
| 5,579,522 A | * | 11/1996 | Christeson et al. | 713/2 |
| 5,692,190 A | * | 11/1997 | Williams | 713/2 |
| 6,122,732 A | * | 9/2000 | Ahuja | 713/1 |
| 6,128,732 A | * | 10/2000 | Chaiken | 713/2 |
| 6,158,000 A | * | 12/2000 | Collins | 713/1 |

* cited by examiner

Primary Examiner—Matthew M. Kim
Assistant Examiner—Fred F. Tzeng
(74) Attorney, Agent, or Firm—George E. Grosser; Andrew Dillon

(57) ABSTRACT

A method for performing configuration tasks prior to and including memory configuration within a processor based system is disclosed. A memory location is first reserved by a basic input/output system (BIOS) firmware for each individual BIOS task. A target routine is then performed using the reserved memory location by the BIOS firmware. The target routine is designed to perform a specific BIOS task. Finally, the reserved memory location is released by the BIOS firmware, after the target routine has been successfully completed.

12 Claims, 4 Drawing Sheets

METHOD FOR PERFORMING CONFIGURATION TASKS PRIOR TO AND INCLUDING MEMORY CONFIGURATION WITHIN A PROCESSOR-BASED SYSTEM

BACKGROUND OF THE INVENTION

1. Technical Field

The present invention relates to a method for performing configuration tasks in general, and in particular to a method for simplifying configuration tasks prior to and including memory configuration within a processor-based system. Still more particularly, the preferred embodiment of the present invention relates to a method for configuring RAMBUS® memories within a computer system.

2. Description of the Prior Art

A firmware commonly known as the Basic Input/Output System (BIOS) is responsible for performing various configuration and initialization tasks during bootup of a computer system. Because of the increasingly complex tasks BIOS must perform in the resource-limited environment prior to memory configuration, the BIOS programmer must select from a variety of techniques to overcome the resource limitation problem. For example, a BIOS programmer may map register usage; a BIOS programmer may opt for a linear programming method that utilizes few subroutines; or a BIOS programmer may opt to retrieve and/or recompute values many times to avoid storing configuration values. However, each of the above-mentioned techniques has its drawbacks. For example, intensive register management can be prone to errors; linear programming methods negate the benefits of structured programming methods and make BIOS larger and more difficult to maintain; fetching data repeatedly increases the length of time required to perform a configuration task.

Another technique, which is specific to a type of memory known as RAMBUS® memory, is to simply ignore the problem and to require all the 3 memories to be identical. This will make the memory configuration task much easier for the BIOS programmer; however, it may present problems to a person who wants to update those RAMBUS® memories to a different configuration.

Consequently, it is desirable to have a better solution to the problems presented by the rapidly growing complexity of configuration tasks that must be performed prior to memory configuration, and the increasing complexity of the memory configuration task itself.

SUMMARY OF THE INVENTION

In accordance with a preferred embodiment of the present invention, a memory location is first reserved by Basic Input/Output System (BIOS) firmware for each individual BIOS task. A target routine is then executed using the reserved memory location by the BIOS firmware. The target routine is designed to perform a specific BIOS task. Finally, the reserved memory location is released by the BIOS firmware, after the target routine has been successfully completed.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention is applicable to all configuration and initialization tasks that are required to be performed prior to and during memory configuration within a processor-based system during a system bootup. A preferred embodiment of the present invention is illustrated by means of a method for configuring RAMBUS® memories within a computer system during the system bootup.

RAMBUS® memories, also known as RAMBUS® Direct RDRAMs®, are general purpose high-performance memories that are suitable for use in a broad range of data processing systems such as personal computers and workstations. A RAMBUS®-based system typically includes three main elements, namely, a RAMBUS® controller, RAMBUS® channels, and RAMBUS® RIMM™ modules. The RAMBUS® controller provides an interface between a processor and the RAMBUS® channels. The RAMBUS® channels provide proper electrical connections and signals between the RAMBUS® RIMM™ modules and the RAMBUS® controller. The RAMBUS® RIMM™ modules are RDRAM devices mounted on a suitable printed circuit card assembly having Serial Presence Detect electrically erasable programmable read only memories (SPD EEPROMs). Detailed information about RAMBUS® controller, RAMBUS® channels, and RAMBUS® RIMM™ modules can be found on the RAMBUS® website: http://www.rambus.com, the pertinent portion of which is incorporated by reference herein.

Generally speaking, RAMBUS® memory is significantly more difficult to configure than its predecessor—synchronous dynamic random access memory (SDRAM)—and other memory manufactured using older technology. This is because RAMBUS® memories cannot be properly configured in all cases unless status information can be stored in some form of memory, and a memory element for storing such information is typically not available at this point of the system bootup.

By the same token, RAMBUS®-based systems are also difficult to configure because the status information that must be collected and analyzed prior to determining how to configure a RAMBUS®-based system is usually many times larger than the typical register size of a processor within a computer system. Furthermore, the inability to use structured programming technique to program Basic Input/Output System (BIOS) limits a BIOS programmer's ability to generate the required configuration code, which also contributes to the added difficulty in configuring the RAMBUS®-based system. In fact, the problem caused by this restriction is so severe that some BIOS programmers forcibly simplify or even ignore the problem using techniques or shortcuts such as those mentioned previously so that they can generate some form of workable configuration code. The present invention intends to address the above-mentioned problem by providing a novel and complete solution.

Figure 1:
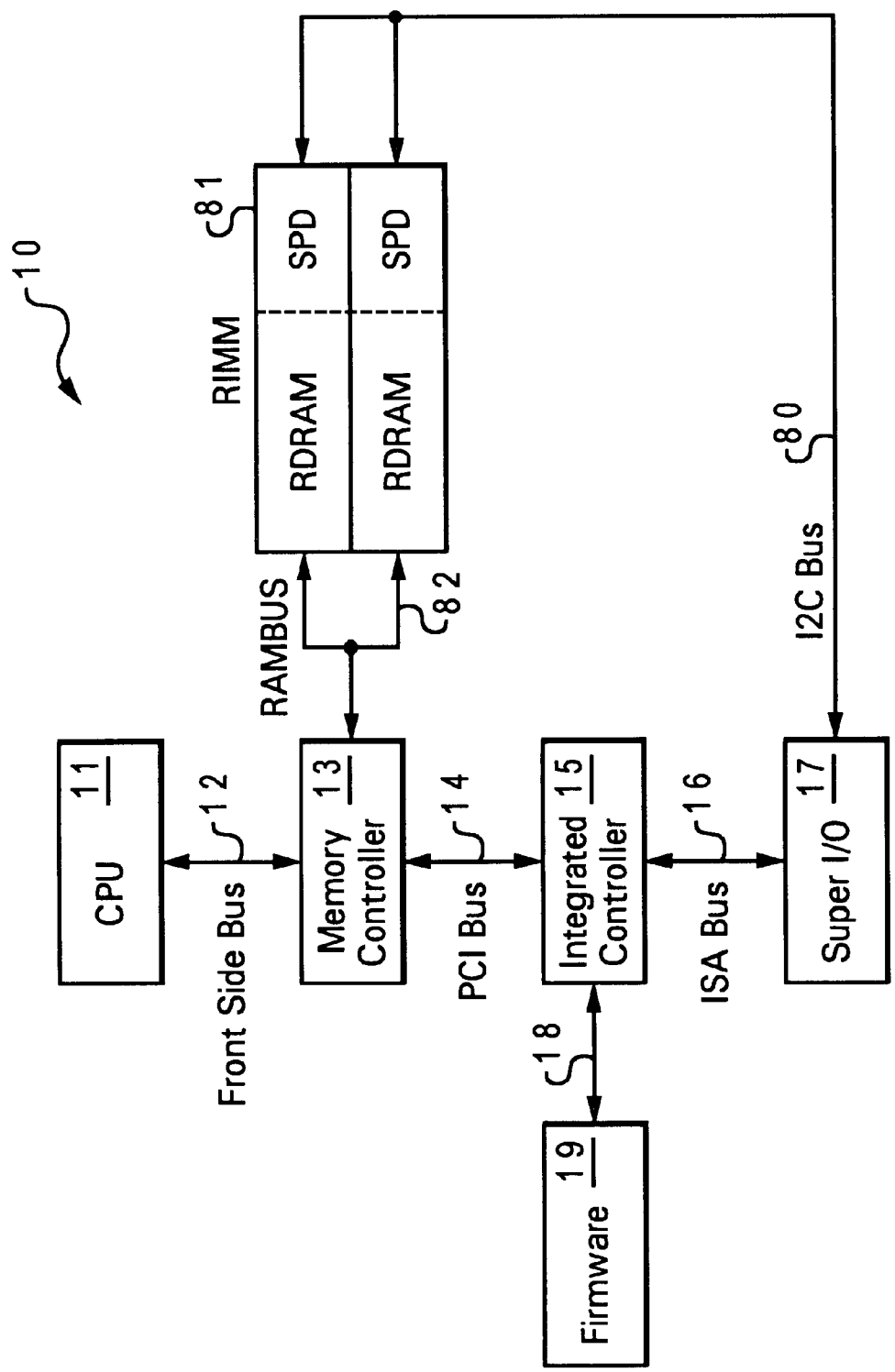
FIG. 1 is a block diagram of the core elements of a computer system in which a preferred embodiment of the present invention can be incorporated.

Referring now to the drawings and in particular to FIG. 1, there is illustrated a block diagram of a computer system in which a preferred embodiment of the present invention can be incorporated. Within a computer system 10, a memory controller 13 is coupled to a central processing unit (CPU) 11 via a front side bus 12. Memory controller 13 is also coupled to a group of RIMM™ modules 81 via a RAM-BUS® 82 and to an integrated controller 15 via a peripheral component interconnect (PCI) bus 14. A Super I/O 17 is connected to integrated controller 15 and RIMM™ modules 81 via an industry standard architecture (ISA) bus 16 and an I²C bus 80, respectively. Memory controller 13 and integrated controller 15 decode access cycles and route them to an appropriate bus. When power is applied to computer system 10, the default configurations of memory controller 13 and integrated controller 15 allow CPU 11 to access firmware 19 in which BIOS is stored. CPU 11 fetches BIOS instructions from firmware 19 so that integrated controller 15 and Super I/O 17 can be configured to access SPD EEPROMs on RIMM™ modules 81 via I²C bus 80.

Figure 2:
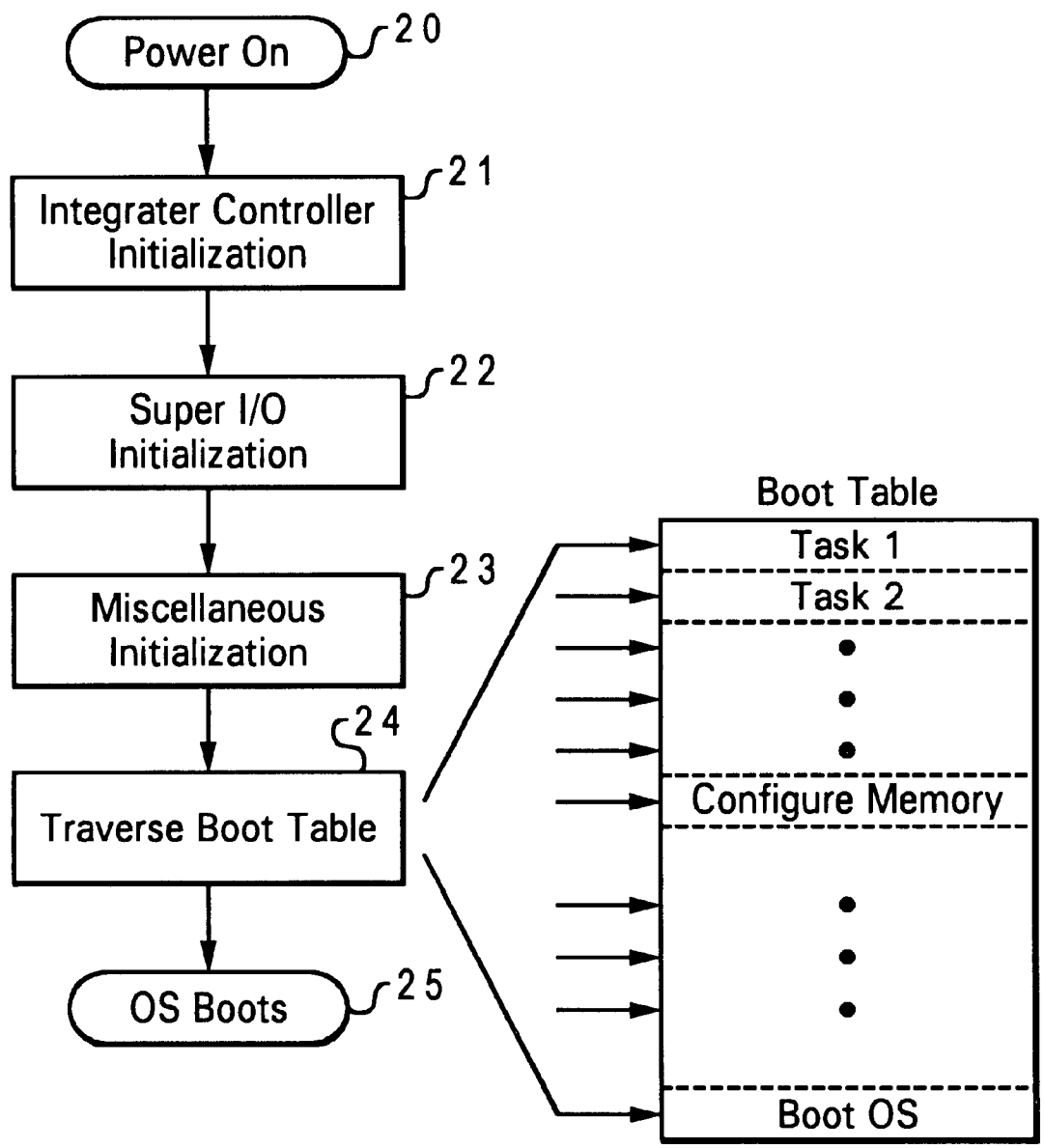
FIG. 2 is a high-level logic flow diagram of a BIOS that initializes the computer system of FIG. 1, in accordance with a preferred embodiment of the present invention.

With reference now to FIG. 2, there is depicted a high-level logic flow diagram of the BIOS needed to initialize a computer system, such as computer system 10 from FIG. 1, in accordance with a preferred embodiment of the present invention. After the power to the computer system has been turned on, as shown in block 20, the initialization of integrated controller 15 begins, as depicted in block 21, such that integrated controller 15 can communicate with Super I/O 17. Then, the initialization of Super I/O 17 begins, as illustrated in block 22, such that I²C bus 80 can be accessed and the SPD data for each RIMM™ module 81 can be examined. Next, miscellaneous initialization occurs, as shown in block 23.

At this point, the central control mechanism of the BIOS begins to take over, and most BIOS configuration/initialization tasks are performed in response to this central control mechanism. Each task is obtained by traversing a built-in table of tasks, known as a boot table, as depicted in block 24. As shown in FIG. 2, one of the many tasks within the boot table is configuring memory. The final task in the boot table is a boot-operating-system task-a task that never returns. The boot-operating-system task turns the control of the configured computer system over to an appropriate boot media such as a hard drive, a floppy drive, a network interface, etc., and thus the initial program load (IPL) process begins, as illustrated in block 25. The present invention is applicable to the power on step shown in block 20 through the traverse boot table step shown in block 24.

In accordance with a preferred embodiment of the present invention, the method for performing a configuration task prior to and including memory configuration within a processor based system during a system bootup is in the form of a subroutine known as a *Faux Call*. The Faux Call subroutine preserves registers on entry of the Faux Call subroutine, provides a mechanism to call another subroutine known as a target routine, provides return flags, provides a stack for the target routine in use, and preserves registers on exit of the Faux Call subroutine. A target routine, typically stored within the BIOS firmware, is called to perform a specific configuration task. For example, a target routine such as a RAMBUS® memory configuration task will be called when the BIOS is configuring RAMBUS® memory.

Figure 3:
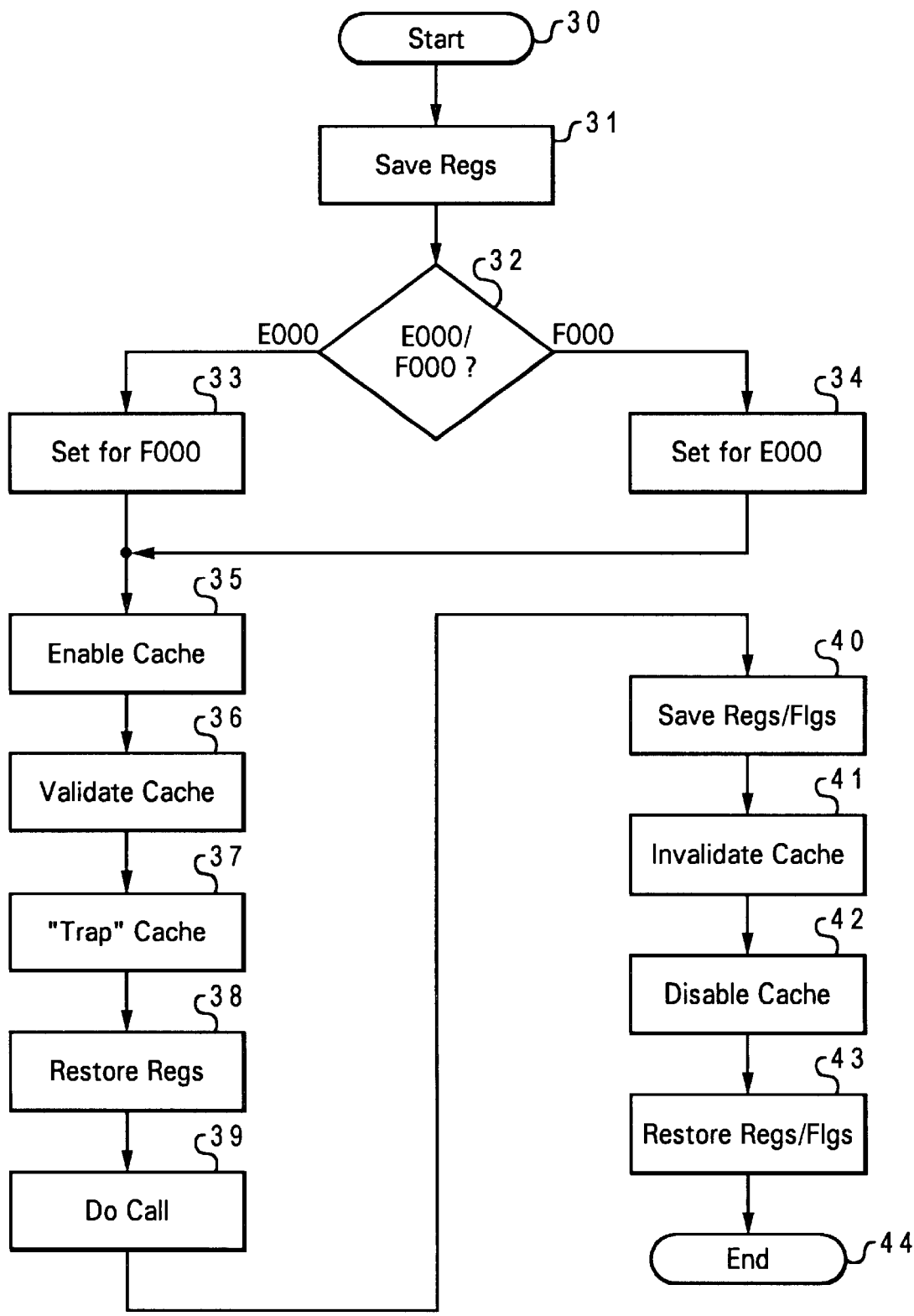
FIG. 3 is a high-level logic flow diagram of a method for performing a configuration/initialization task, in accordance with a preferred embodiment of the present invention.

Referring now to FIG. 3, there is depicted a high-level logic flow diagram of a method for performing a configuration task, such as configuring a RAMBUS® memory within the computer system from FIG. 1, in accordance with a preferred embodiment of the present invention. When the Faux Call subroutine is called by the BIOS, the Faux Call subroutine begins, as shown in block 30. The register values being passed to the target routine are saved, as depicted in block 31. This is done using some unused registers within a memory controller, an integrated controller, or a CPU. For example, in an Intel® Pentium™ II-based system, MMX registers of a Pentium™ II processor may be used for the storage function depicted in block 31.

The current memory execution segment is then determined, as shown in block 32. This is done because a stack, or known as a *Faux Stack*, generated by the Faux Call subroutine needs to be set up in an address location that does not conflict with other configuration and initialization tasks. For a personal computer system, for example, BIOS firmware is assigned to two memory segments. The first segment, being the normal boot segment, is from memory addresses 0xE0000–0XEFFFF inclusive. The second segment, being the error recovery segment, is from memory addresses 0xF0000–0xFFFFF inclusive. These two segments are commonly referred to as the 0xE000 and 0xF000 segments, respectively. If BIOS execution is in 0xE000 segment, then the Faux Stack needs to be set up in the 0xF000 segment, as illustrated in block 33. On the other hand, if BIOS execution is in 0xF000 segment, then the Faux Stack needs to be set up in the 0xE000 segment, as depicted in block 34.

Once the location of the Faux Stack has been set, the cache of the CPU is then enabled, as shown in block 35. The initial state of the cache is empty, so all reads and writes will go to the BIOS firmware. Reads are done on the memory addresses occupied by the Faux Stack so that the cache holds valid information, as depicted in block 36. Now that there is active data in the cache, the cache mode is changed to trap the active cache data, as illustrated in block 37. Reads and writes to the addresses of the Faux Stack will now be serviced by the cache and not sent through to the BIOS firmware.

At this point, the registers previously saved (from block 31) are restored, as shown in block 38. Since the Faux Stack is ready and the registers have been restored, it is time to call a target routine, as depicted in block 39. As mentioned previously, a target routine is a firmware routine designed to perform a specific configuration task. This means when configuring a memory, for example, the target routine for configuring memories is called. For example, the address of the target routine is then passed to the Faux Call subroutine in a "bx" register of the Intel® Pentium™ II processor. Upon completion of the target routine, the Faux Call subroutine saves all the registers and processor flags in a fashion similar to the step shown in block 31, as depicted in block 40.

In order to avoid any unintended interactions between the CPU's cache and the memory (i.e., BIOS firmware), the contents of the cache are invalidated, as shown block 41. This means the cache holds no valid data after this point. The cache is then disabled, as depicted in block 42, leaving the cache idle and no longer participating in memory cycles. Finally, the registers and flags previously saved (from block 40) are restored, as illustrated in block 43, so that it appears as though the processor just exited the target routine. Execution control is returned to the BIOS firmware that called the Faux Call subroutine, as depicted in block 44. A copy of the Faux Call subroutine written in assembly code in enclosed as an Appendix.

The present invention also includes the addition of a flag, known as a boot table flag, to the boot table within the BIOS. Each boot table flag indicates under what conditions certain tasks, such as cold boot, warm boot, power save reboot, etc., should be executed. The boot table flags also indicate which routines in the boot table need to be called using the Faux Call subroutine.

Figure 4:
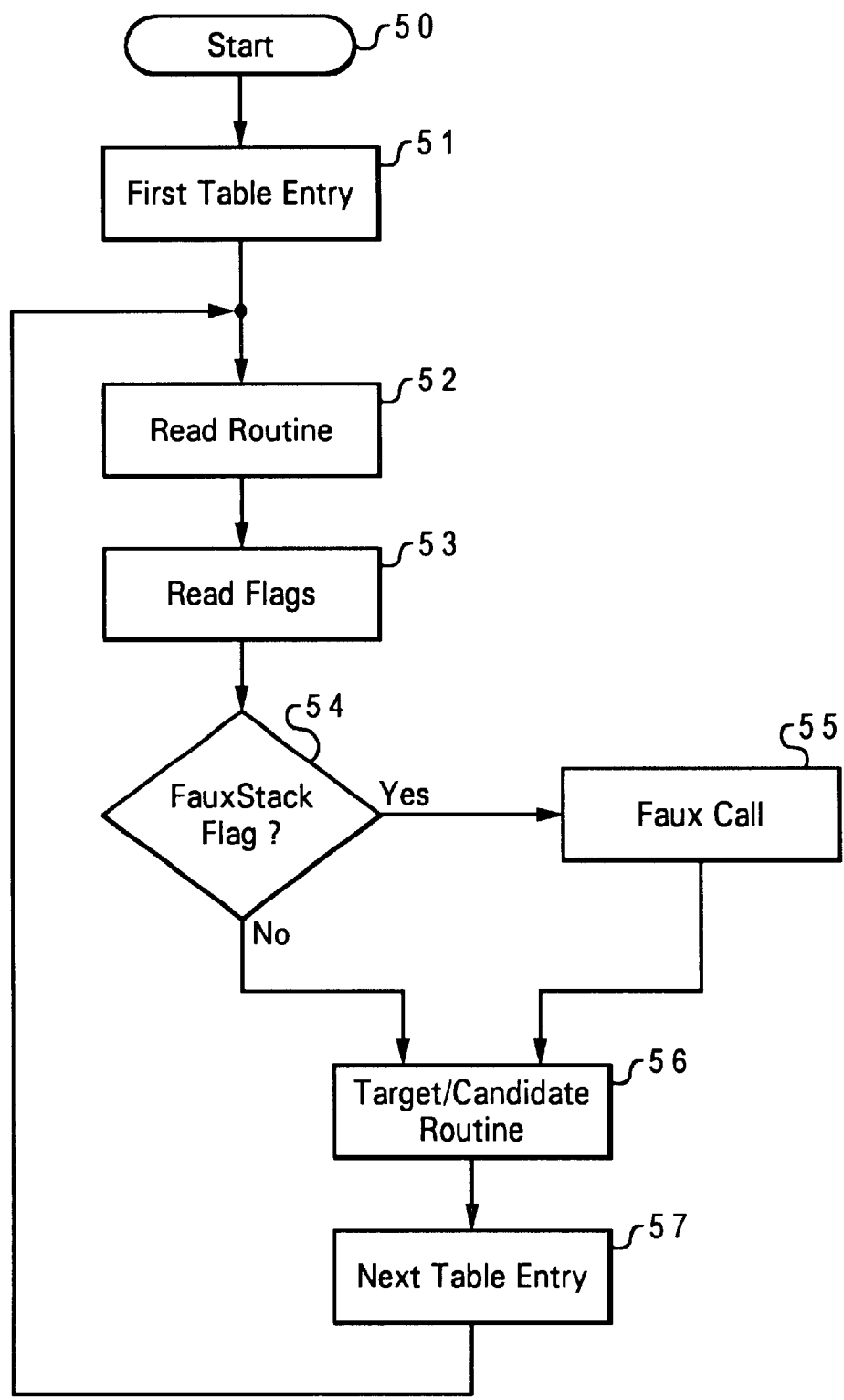
FIG. 4 is a high-level logic flow diagram of a method for modifying a boot table within the BIOS of the computer system from FIG. 1, in accordance with a preferred embodiment of the present invention.

With reference now to FIG. 4, there is illustrated a high-level flow diagram of a method for modifying a boot table within the BIOS, in accordance with a preferred embodiment of the present invention. The process that traverses the boot table (block 24 in FIG. 2) begins at block 50. The registers that keep track of the next task in the boot table are initialized to the address of the first entry of the boot table, as shown in block 51. Then the address of a candidate routine is read, as depicted in block 52, and the corresponding boot table flags are also read, as illustrated in block 53. The boot table flags for the candidate routine are checked, as illustrated in block 54. If a Faux Stack is needed, then the control is passed to block 55. If the Faux Stack is not needed, then the control is simply passed to the candidate routine. In either case, the candidate routine is executed, as shown 56 block. Upon completion of the candidate routine, the registers are advanced to process the next entry in the boot table, as depicted block 57. Control is then passed back to block 52, forming an infinite loop, that only terminates when the subsequent target routine is the candidate routine to perform the IPL.

In order to configure a computer system having RAM-BUS® memories, a static memory element is needed so that normal programming practices can be used in the BIOS firmware prior to and including the memory configuration task. As a preferred embodiment of the present invention, a cache, which is organized in the form of a stack (i.e., Faux Stack), is utilized as storage by the BIOS. This means that normal programming practices such as nested subroutines, subroutine argument passing on the stack, automatic variables, and module scope variables can be utilized for the task of memory configuration. The only significant omission to the BIOS programmer's tool box is a lack of global variables because the stack is destroyed between tasks. This is not a defect; this behavior is desirable because it keeps the activities of each task from interacting via memory, thereby simplifying the BIOS programmer's programming task.

As a result of the present invention, the reliability of the computer system is improved because of the simplification of the BIOS programmer's job. The service costs are reduced (i.e., fewer support line calls, fewer field service calls) because difficult tasks like RAMBUS® configuration can be done correctly and completely. Manufacturing costs are also reduced when dealing with complex technologies like RAMBUS®, because there are fewer BIOS restrictions on purchasing RIMM™.

As has been described, the present invention provides an improved method for simplifying the task of configuring memory and other tasks prior to the configuration of memory. Although the present invention has been described in the context of a fully functional computer system, those skilled in the art will appreciate that the method of the present invention is capable of being used in any processor-based system with assorted tasks that are required to be performed in an environment with limited memory resources. The present invention removes the need for BIOS programmers to map register usage and to take the risk of inadvertently destroying register values. In addition, the present invention also allows the BIOS programmer to organize the BIOS code into any number of subroutines and allows for the use of recursive routines. Moreover, the present invention allows the storage of configuration information and status so that this information may simply be retrieved using a simple memory access versus recomputing or reacquiring, thereby reducing the time required to perform the tasks. The present invention allows the BIOS programmer to solve the whole problem, instead of using simplifying assumptions, and passing the difficulty of is memory configuration from the BIOS programmer to users.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Example of signal bearing media include, without limitation, recordable type media such as floppy disks, hard disks, or CDROMs and transmission type media such as analog or digital communication links.

While the invention has been particularly shown and described with reference to a preferred embodiment, it will be understood by those skilled in the art that various changes in form and detail may be made therein without departing from the spirit and scope of the invention.

What is claimed is:

1. A method for performing a function call before a main memory within a processor based system is configured during a system boot, said method comprising the steps of:

before said main memory is configured during said system boot, configuring a cache memory within a processor to cache data accessible by a bootup firmware;

initializing a stack within said configured cache memory;

performing a target routine of said bootup firmware using said initialized stack within said configured cache memory; and releasing said configured cache memory by said bootup firmware.

2. The method according to claim 1, wherein said bootup firmware is a basic input/output system (BIOS) firmware.

3. The method according to claim 1, wherein said configuring step further includes a step of validating said cache memory by said bootup firmware.

4. The method according to claim 1, wherein said performing step further includes a step of trapping data from said target routine using said cache memory.

5. The method according to claim 1, wherein said cache memory is a static memory.

6. The method according to claim 1, wherein said releasing step further includes a step of invalidating said cache memory.

7. A computer program product residing on a computer usable medium for performing a function call before a main memory within a processor based system is initialized during a system boot, said computer program product comprising:

program code means for configuring a cache memory within a processor to cache data accessible by a bootup firmware before said main memory is configured during said system boot;

program code means for initializing a stack within said configured cache memory;

program code means for performing a target routine of said bootup firmware using said initialized stack within said configured cache memory; and program code means for releasing said configured cache memory by said bootup firmware.

8. The computer program product according to claim 7, wherein said program code means is a basic input/output system (BIOS) firmware.

9. The computer program product according to claim 7, wherein said program code means for configuring further includes a program code means for validating said cache memory by said bootup firmware.

10. The computer program product according to claim 7, wherein said program code means for performing further includes program code means for trapping data from said target routine using said cache memory.

11. The computer program product according to claim 7, wherein said cache memory is a static memory.

12. The computer program product according to claim 7, wherein said program code means for releasing further includes a program code means for invalidating said cache memory.

* * * * *